US007293462B2

(12) United States Patent
Lee et al.

(10) Patent No.: US 7,293,462 B2
(45) Date of Patent: Nov. 13, 2007

(54) ISOLATION OF SHORT-CIRCUITED SENSOR CELLS FOR HIGH-RELIABILITY OPERATION OF SENSOR ARRAY

(75) Inventors: Warren Lee, Clifton Park, NY (US); David Martin Mills, Niskayuna, NY (US); Glenn Scott Claydon, Wynantskill, NY (US); Kenneth Wayne Rigby, Clifton Park, NY (US); Wei-Cheng Tian, Clifton Park, NY (US); Ye-Ming Li, Schenectady, NY (US); Jie Sun, Saratoga, CA (US); Lowell Scott Smith, Niskayuna, NY (US); Stanley Chienwu Chu, Cupertino, CA (US); Sam Yie-Sum Wong, Hillsborough, CA (US); Hyon-Jin Kwon, Freemont, CA (US)

(73) Assignee: General Electric Company, Niskayuna, NY (US)

( * ) Notice: Subject to any disclaimer, the term of this patent is extended or adjusted under 35 U.S.C. 154(b) by 173 days.

(21) Appl. No.: 11/028,789

(22) Filed: Jan. 4, 2005

(65) Prior Publication Data

US 2006/0145059 A1 Jul. 6, 2006

(51) Int. Cl.
*G01H 11/00* (2006.01)

(52) U.S. Cl. ........................................................ 73/649

(58) Field of Classification Search ..................... None
See application file for complete search history.

(56) References Cited

U.S. PATENT DOCUMENTS

| | | | | |
|---|---|---|---|---|
| 3,838,314 A * | 9/1974 | Boothman et al. | ............ | 361/77 |
| 5,956,292 A * | 9/1999 | Bernstein | .................... | 367/140 |
| 6,055,150 A * | 4/2000 | Clinton et al. | .............. | 361/234 |
| 2004/0122304 A1* | 6/2004 | Duric et al. | ................ | 600/407 |

* cited by examiner

*Primary Examiner*—Robert Raevis
(74) *Attorney, Agent, or Firm*—Fletcher Yoder

(57) ABSTRACT

A device comprising an array of sensors and a multiplicity of bus lines, each sensor being electrically connected to a respective bus line and comprising a respective multiplicity of groups of micromachined sensor cells, the sensor cell groups of a particular sensor being electrically coupled to each other via the bus line to which that sensor is connected, each sensor cell group comprising a respective multiplicity of micromachined sensor cells that are electrically interconnected to each other and not switchably disconnectable from each other, the device further comprising means for isolating any one of the sensor cell groups from its associated bus line and in response to any one of the micromachined sensor cells of that sensor cell group being short-circuited to ground. In one implementation, the isolating means comprise a multiplicity of fuses. In another implementation, the isolating means comprise a multiplicity of short circuit protection modules, each module comprising a current sensor circuit and an electrical isolation switch.

15 Claims, 14 Drawing Sheets

ISOLATION OF SHORT-CIRCUITED SENSOR CELLS FOR HIGH-RELIABILITY OPERATION OF SENSOR ARRAY

BACKGROUND OF THE INVENTION

This invention generally relates to arrays of sensors that operate electronically. In particular, the invention relates to micromachined ultrasonic transducer (MUT) arrays. One specific application for MUTs is in medical diagnostic ultrasound imaging systems. Another specific example is for non-destructive evaluation of materials, such as castings, forgings, or pipelines, using ultrasound.

The quality or resolution of an ultrasound image is partly a function of the number of transducers that respectively constitute the transmit and receive apertures of the transducer array. Accordingly, to achieve high image quality, a large number of transducers is desirable for both two- and three-dimensional imaging applications. The ultrasound transducers are typically located in a hand-held transducer probe that is connected by a flexible cable to an electronics unit that processes the transducer signals and generates ultrasound images. The transducer probe may carry both ultrasound transmit circuitry and ultrasound receive circuitry.

Recently semiconductor processes have been used to manufacture ultrasonic transducers of a type known as micromachined ultrasonic transducers (MUTs), which may be of the capacitive (cMUT) or piezoelectric (pMUT) variety. MUTs are tiny diaphragm-like devices with electrodes that convert the sound vibration of a received ultrasound signal into a modulated capacitance. For transmission the capacitive charge is modulated to vibrate the diaphragm of the device and thereby transmit a sound wave. One advantage of MUTs is that they can be made using semiconductor fabrication processes, such as microfabrication processes grouped under the heading "micromachining". The systems resulting from such micromachining processes are typically referred to as "micro electro-mechanical systems" (MEMS). As explained in U.S. Pat. No. 6,359,367:

> Micromachining is the formation of microscopic structures using a combination or subset of (A) Patterning tools (generally lithography such as projection-aligners or wafer-steppers), and (B) Deposition tools such as PVD (physical vapor deposition), CVD (chemical vapor deposition), LPCVD (low-pressure chemical vapor deposition), PECVD (plasma chemical vapor deposition), and (C) Etching tools such as wet-chemical etching, plasma-etching, ion-milling, sputter-etching or laser-etching. Micromachining is typically performed on substrates or wafers made of silicon, glass, sapphire or ceramic. Such substrates or wafers are generally very flat and smooth and have lateral dimensions in inches. They are usually processed as groups in cassettes as they travel from process tool to process tool. Each substrate can advantageously (but not necessarily) incorporate numerous copies of the product. There are two generic types of micromachining . . . 1) Bulk micromachining wherein the wafer or substrate has large portions of its thickness sculptured, and 2) Surface micromachining wherein the sculpturing is generally limited to the surface, and particularly to thin deposited films on the surface. The micromachining definition used herein includes the use of conventional or known micromachinable materials including silicon, sapphire, glass materials of all types, polymers (such as polyimide), polysilicon, silicon nitride, silicon oxynitride, thin film metals such as aluminum alloys, copper alloys and tungsten, spin-on-glasses (SOGs), implantable or diffused dopants and grown films such as silicon oxides and nitrides.

The same definition of micromachining is adopted herein.

Each cMUT has a membrane that spans a cavity that is typically evacuated. This membrane is held close to the substrate surface by an applied bias voltage. By applying an oscillatory signal to the already biased cMUT, the membrane can be made to vibrate, thus allowing it to radiate acoustical energy. Likewise, when acoustic waves are incident on the membrane the resulting vibrations can be detected as voltage changes on the cMUT. A cMUT cell is the term used to describe a single one of these "drum" structures. The cMUT cells can be very small structures. Typical cell dimensions are 25-50 microns from flat edge to flat edge in the case of a hexagonal structure. The dimensions of the cells are in many ways dictated by the designed acoustical response.

To achieve the best possible performance, cMUTs must be exposed to extremely high electrical fields. It has been shown by other researchers that cMUTs will only outperform conventional PZT transducers if they are operated at high electric fields near the collapse voltage of the cMUT. The ability of the cMUT structure to endure the high electric fields for arrays of many elements, each containing thousands of cells connected in parallel, with a distribution of collapse voltages is essential to the success of these devices. One shortfall with current cMUT designs lies in the electrode patterning on the cMUT, and the cascade of events that occur when a single cell short circuits to ground. Currently, the electrode on each cell is connected to its nearest neighbors using simply patterned "spoke" interconnects. In the event that a single cell forms a short circuit to ground, the entire element is effectively short-circuited to ground, due to this interconnection. The problem is compounded by the reduction in bias voltage that is available to other functioning cMUT elements due to the shorted elements. The reduced cMUT bias voltage degrades the performance of the cMUT. In addition, future cMUT arrays may contain thousands of elements instead of only several hundred. Thus, there exists a cascading effect whereby only a few individual cells out of thousands can render an entire array useless.

There is a need to improve the reliability and performance of a MUT array in the event that a single or multiple MUT cells form a short circuit to ground.

BRIEF DESCRIPTION OF THE INVENTION

The invention provides a very simple and cost-effective way to ensure the performance of a MUT array against failures due to short-circuited cells caused by any means processing anomalies, natural statistical variations, contaminants, etc. In conventional MUT arrays, there may be thousands of cells. Even if only a few of the cells form short circuits to ground, imaging performance can be substantially degraded. With the present invention, those shorted cells will be isolated and will have a negligible effect on imaging performance.

One aspect of the invention is a device comprising an array of sensors and a multiplicity of bias voltage bus lines, each sensor being electrically connected to a respective bias voltage bus line and comprising a respective multiplicity of groups of micromachined sensor cells, the sensor cell groups of a particular sensor being electrically coupled to each other via the bias voltage bus line to which that sensor is connected, each sensor cell group comprising a respective multiplicity of micromachined sensor cells that are electrically interconnected to each other and not switchably disconnectable from each other, the device further comprising a sensor cell group that is isolated from other sensor cell groups, is short-circuited to ground and is not electrically coupled to any bias voltage bus line.

Another aspect of the invention is a device comprising an array of sensors and a multiplicity of bias voltage bus lines, each sensor being electrically connected to a respective bias voltage bus line and comprising a respective multiplicity of groups of micromachined sensor cells, the sensor cell groups of a particular sensor being electrically coupled to each other via the bias voltage bus line to which that sensor is connected, each sensor cell group comprising a respective multiplicity of micromachined sensor cells that are electrically interconnected to each other and not switchably disconnectable from each other, the device further comprising means for isolating any one of the sensor cell groups from its associated bias voltage bus line and in response to any one of the micromachined sensor cells of that sensor cell group being short-circuited to ground.

A further aspect of the invention is a device comprising: a bias voltage bus line; a multiplicity of micromachined sensor cells each comprising a respective electrode, the electrodes of the multiplicity of sensor cells being interconnected and not switchably disconnectable from each other; and a fuse that bridges a first junction electrically connected to the bias voltage bus line and a second junction electrically connected to the electrode of one of the multiplicity of sensor cells, wherein the fuse is designed to blow in response to short circuiting of the electrodes of the multiplicity of sensor cells.

Yet another aspect of the invention is a device comprising: a bias voltage bus line; a multiplicity of micromachined sensor cells each comprising a respective electrode, the electrodes of the multiplicity of sensor cells being interconnected and not switchably disconnectable from each other; and a short circuit protection module that bridges a first junction electrically connected to the bias voltage bus line and a second junction electrically connected to the electrode of one of the multiplicity of sensor cells, the short circuit protection module comprising: a current sensor circuit that detects a level of current flowing through the electrodes of the multiplicity of sensor cells; and an electrical isolation switch that couples the first junction to the second junction when in an ON state, but not when in an OFF state, wherein the current sensor circuit causes the electrical isolation switch to transition from the ON state to the OFF state in response to sensing a current level indicative of a short circuit in the electrodes of the multiplicity of sensor cells.

A further aspect of the invention is a device comprising: a bias voltage bus line; and a two-dimensional array of micromachined sensor cells, each sensor cell comprising a respective electrode, the electrode of each sensor cell being electrically connected to the electrodes of each neighboring sensor cell, the connected electrodes being not switchably disconnectable from each other, the interconnected electrodes of the array being electrically connected to the bias voltage bus line, wherein each connection between an electrode of one sensor cell and the electrodes of the neighboring sensor cells of the one sensor cell comprises a respective fuse that is designed to blow in response to short circuiting of the electrode of the one sensor cell.

Other aspects of the invention are disclosed and claimed below.

BRIEF DESCRIPTION OF THE DRAWINGS

Reference will now be made to the drawings in which similar elements in different drawings bear the same reference numerals.

DETAILED DESCRIPTION OF THE INVENTION

For purposes of illustration, various embodiments of the invention will be described in the context of an array comprising capacitive micromachined ultrasonic transducers (cMUTs). However, it should be understood that the aspects of the invention disclosed herein are not limited in their application to cMUT arrays, but rather may also be applied to arrays that employ pMUTs. The same aspects of the invention also have application in micromachined arrays of optical, thermal or pressure sensor elements.

Figure 1:
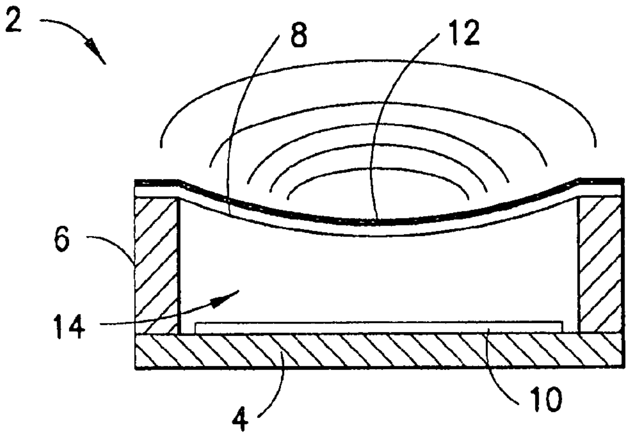
PRIOR ART FIG. 1
FIG. 1 is a drawing showing a cross-sectional view of a typical cMUT cell.

Referring to FIG. 1, a typical cMUT transducer cell 2 is shown in cross section. An array of such cMUT transducer cells is typically fabricated on a substrate 4, such as a heavily doped silicon (hence, semiconductive) wafer. For each cMUT transducer cell, a thin membrane or diaphragm 8, which may be made of silicon or silicon nitride, is suspended above the substrate 4. The membrane 8 is supported on its periphery by an insulating support 6, which may be made of silicon oxide or silicon nitride. The cavity 14 between the membrane 8 and the substrate 4 may be air- or gas-filled or wholly or partially evacuated. Typically, cMUTs are evacuated as completely as the processes allow. A film or layer of conductive material, such as aluminum alloy or other suitable conductive material, forms an electrode 12 on the membrane 8, and another film or layer made of conductive material forms an electrode 10 on the substrate 4. Alternatively, the bottom electrode can be formed by appropriate doping of the semiconductive substrate 4.

The two electrodes 10 and 12, separated by the cavity 14, form a capacitance. When an impinging acoustic signal causes the membrane 8 to vibrate, the variation in the capacitance can be detected using associated electronics (not shown in FIG. 1), thereby transducing the acoustic signal into an electrical signal. Conversely, an AC signal applied to one of the electrodes will modulate the charge on the electrode, which in turn causes a modulation in the capacitive force between the electrodes, the latter causing the diaphragm to move and thereby transmit an acoustic signal.

The individual cells can have round, rectangular, hexagonal, or other peripheral shapes. The cMUT cells can have different dimensions so that the transducer subelement will have composite characteristics of the different cell sizes, giving the transducer a broadband characteristic.

It is difficult to produce electronics that would allow individual control over such small cells. While in terms of the acoustical performance of the array as whole, the small cell size is excellent and leads to great flexibility, control is limited to larger structures. Grouping together multiple cells and connecting them electrically allows one to create a larger subelement, which can have the individual control while maintaining the desired acoustical response. One can form rings or other elements by connecting subelements together using a switching network. The elements can be reconfigured by changing the state of the switching network to interconnect different subelements to each other. However, individual subelements cannot be reconfigured to form different subelements.

MUT cells can be connected together (i.e., without intervening switches) in the micromachining process to form subelements. The term "acoustical subelement" will be used in the following to describe such a cluster. These acoustical subelements will be interconnected by microelectronic switches to form larger elements by placing such switches within the silicon layer or on a different substrate situated directly adjacent to the transducer array. This construction is based on semiconductor processes that can be done with low cost in high volume.

As used herein, the term "acoustical subelement" is a single cell or a group of electrically connected cells that cannot be reconfigured, i.e., the acoustical subelement is the smallest independently controlled acoustical unit. The term "subelement" means an acoustical subelement and its associated integrated electronics. An "element" is formed by connecting acoustic subelements together using a switching network. The elements can be reconfigured by changing the state of the switching network. At least some of the switches included in the switching network are part of the associated integrated electronics.

Figure 2:
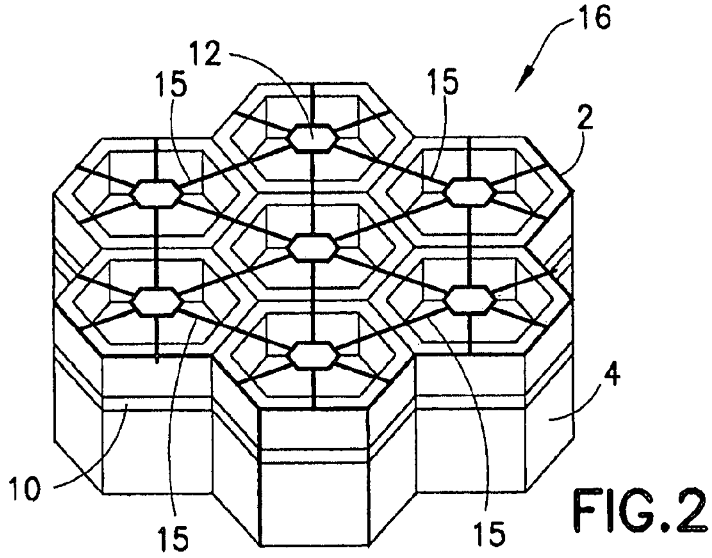
FIG. 2 is a drawing showing a "daisy" subelement formed from seven hexagonal MUT cells having their top and bottom electrodes respectively connected together without intervening switches.

For the purpose of illustration, FIG. 2 shows a "daisy" acoustical subelement 16 made up of seven hexagonal cMUT cells 2: a central cell surrounded by a ring of six cells, each cell in the ring being contiguous with a respective side of the central cell and the adjoining cells in the ring. The top electrodes 12 of each cMUT cell 2 are electrically coupled together by connections that are not switchably disconnectable. In the case of a hexagonal array, six conductors 15 radiate outward from the top electrode 12 like "spokes" and are respectively connected to the top electrodes of the neighboring cMUT cells (except in the case of cells on the periphery, which connect to three, not six, other cells). Similarly, the bottom electrodes 10 of each cell 2 are electrically coupled together by connections that are not switchably disconnectable, forming a seven-times-larger acoustical subelement 16.

Acoustical subelements of the type seen in FIG. 2 can be arranged to form a two-dimensional array on a semiconductive (e.g., silicon) substrate. These acoustical subelements can be reconfigured to form elements, such as annular rings, using a switching network. Reconfigurability using silicon-based ultrasound transducer subelements was described in U.S. patent application Ser. No. 10/383,990. One form of reconfigurability is the mosaic annular array, also described in that patent application. The mosaic annular array concept involves building annular elements by grouping acoustical subelements together using a reconfigurable electronic switching network. The reconfigurability can be used to step the beam along the larger underlying two-dimensional transducer array in order to form a scan or image.

Most apertures will consist of contiguous grouped subelements interconnected to form a single larger element. In this case, it is not necessary to connect every subelement directly to its respective bus line. It is sufficient to connect a limited number of subelements within a given group and then connect the remaining subelements to each other. In this way the transmit signal is propagated from the system along the bus lines and into the element along a limited number of access points. From there the signal spreads within the element through local connections.

Given a particular geometry, the reconfigurable array maps acoustical subelements to system channels. This mapping is designed to provide improved performance. The mapping is done through a switching network, which is ideally placed directly in the substrate upon which the cMUT cells are constructed, but can also be in a different substrate integrated adjacent to the transducer substrate. Since cMUT arrays are built directly on top of a silicon substrate, the switching electronics can be incorporated into that substrate.

Figure 3:
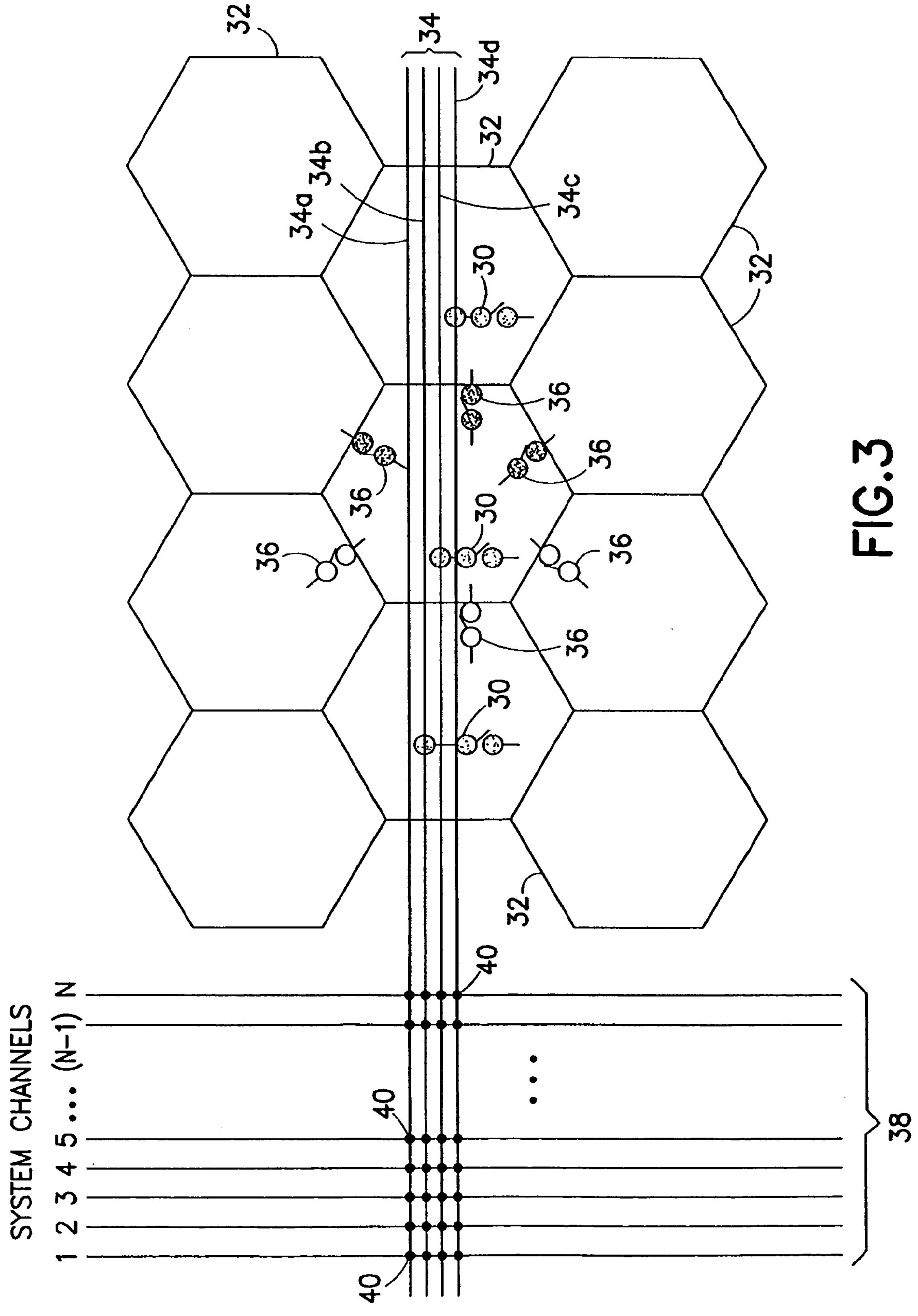
FIG. 3 is a drawing showing an architecture that allows a particular subelement in a particular row of a cMUT array to be connected to any one of a multiplicity of system channel bus lines.

One implementation of a reconfigurable cMUT array is shown in FIG. 3. Here an access switch 30 is used to connect a given acoustical subelement 32 to a row bus line of bus 34. This architecture is directly applicable to a mosaic annular array. In such a device multiple rings can be formed using the present architecture, wherein each ring is connected to a single system channel using one or more access switches, each of which is connected to a bus line, which is in turn connected to a system channel. The access switches are staggered as shown in FIG. 3 to reduce the number required for a given number of bus lines. The row bus lines are connected to the system channels using a cross-point switching matrix as shown in FIG. 3.

The number of access switches and row bus lines is determined by the size constraints and the application. For the purpose of disclosing one exemplary non-limiting implementation (shown in FIG. 3), a single access switch 30 for each acoustical subelement 32 and four row bus lines 34*a*-34*d* for each row of the array will be assumed. The second type of switch is a matrix switch 36, which is used to connect a connection point 42 of one subelement (see FIG. 4) to the connection point of a neighboring subelement. This allows an acoustical subelement 32 to be connected to a system channel through the integrated electronics associated with a neighboring acoustical subelement. This also means that an acoustical subelement may be connected to a system channel even though it is not directly connected via an access switch. While FIG. 3 shows three matrix switches 36 per subelement, it is also possible to have fewer than three to conserve area or to allow for switches which have lower on resistance and therefore have larger area. In addition, matrix switches can be used to route around a known bad subelement for a given array. Finally, while hexagonal subelements are shown, columnar or rectangular subelements are also possible and these might require fewer switches.

Figure 4:
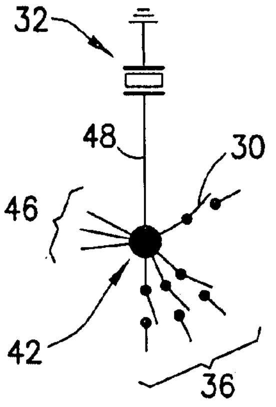
FIG. 4 is a drawing showing connections to a common connection point in the electronics associated with a particular acoustical subelement in accordance with the embodiment depicted in FIG. 3.

Referring to FIG. 4, each of the subelements comprises a common connection point 42 in the electronics associated with the acoustical subelement 32. This common connection point 42 electrically connects eight components in each subelement. The common connection point 42 connects the acoustical subelement or transducer 32 to the access switch 30 for that subelement, to the three matrix switches 36 associated with that subelement, and to the three matrix switches associated with three neighboring subelements via connections 46. A signal that travels through a matrix switch gets connected to the common connection point of the neighboring subelement. The line connecting the top electrodes of the cMUT cells of a particular subelement to its connection point carries a bias voltage and is not switchably disconnectable. Lines that carry a bias voltage for the operation of electronic sensors will be referred to herein as "bias voltage bus lines".

FIG. 3 depicts how the switching network might work for a particular subelement. This is only an exemplary arrangement. A bus 34, which contains four row bus lines 34*a* through 34*d*, runs down the row of subelements 32. FIG. 3 shows only three subelements in this row, but it should be understood that other subelements in this row are not shown. The row bus lines of bus 34 are multiplexed to system channel bus lines of system channel bus 38 at the end of a row by means of multiplexing switches 40, which form a cross-point switching matrix. As seen in FIG. 3, each row bus line 34*a*-34*d* can be connected to any one of the system channel bus lines of bus 38 by turning on the appropriate multiplexing switch 40 and turning off the multiplexing switches that connect the particular row bus line to the other system channel bus lines. These multiplexing electronics can be off to the side and thus are not as restricted by size. FIG. 3 shows a fully populated cross-point switching matrix. However, in cases wherein it is not necessary to have switches that allow every bus line to be connected to every system channel, a sparse cross-point switching matrix can be used in which only a small subset of the system channels can be connected to a given bus line, in which case only some of switches 40 depicted in FIG. 3 would be present.

An access switch is so named because it gives a subelement direct access to a bus line. In the exemplary implementation depicted in FIG. 3, there are six other switch connections for each subelement. These connections take the form of matrix switches 36. A matrix switch allows a subelement to be connected to a neighboring subelement. While there are six connections to neighboring subelements for each subelement in this hexagonal pattern, only three switches reside in each subelement while the other three connections are controlled by switches in the neighboring subelements. Thus there is a total of four switches and associated digital addressing and control logic (not shown) in each subelement. This is just one exemplary implementation. The number of bus lines, the number of access switches, and the number and topology of the matrix switches could all be different, but the general concept would remain. Although the access and matrix switches can be separately packaged components, it is possible to fabricate the switches within the same semiconductor substrate on which the MUT array is to be fabricated. The access and matrix switches may comprise high-voltage switching circuits of the type disclosed in U.S. patent application Ser. No. 10/248,968 entitled "Integrated High-Voltage Switching Circuit for Ultrasound Transducer Array".

The present invention improves the reliability and performance of a cMUT array by electrically isolating small regions (e.g., groups or sets of cMUT cells) of each subelement (in arrays wherein subelements are combined to form larger elements) or each element (in arrays wherein subelements are not combined to form larger elements) in the event that any cell electrode forms a short circuit to ground. Known cMUT designs do not incorporate electrical isolation of short-circuited cMUT cells in a cMUT array. Therefore, when a single cell forms a short circuit to ground, the entire subelement (or element in arrays lacking subelements) is rendered useless, reducing imaging performance. In addition, the compound effects (described in more detail in the next paragraph) of subelements shorted to ground may drastically affect the performance of the entire array. Even with a very tightly controlled process, it is unlikely that every cell in a cMUT array will be free of defects. Isolating the few defective cells from the properly functioning ones is critical to maintain transducer reliability and performance.

Figure 5:
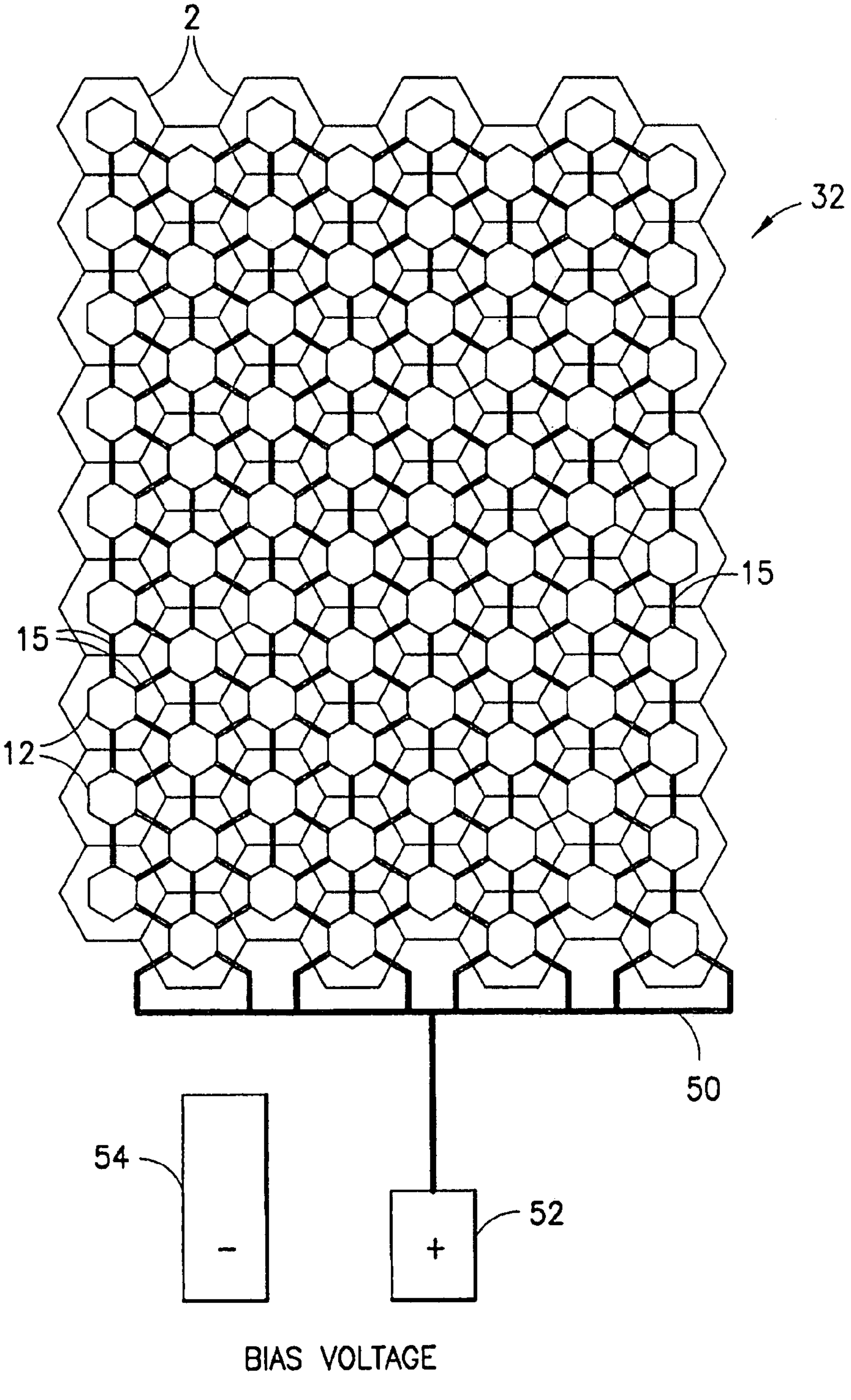
PRIOR ART FIG.5
FIG. 5 is a drawing showing a top view of a multiplicity of hexagonal cMUT cells interconnected in a conventional manner to from a single rectangular acoustical subelement.
Figure 6:
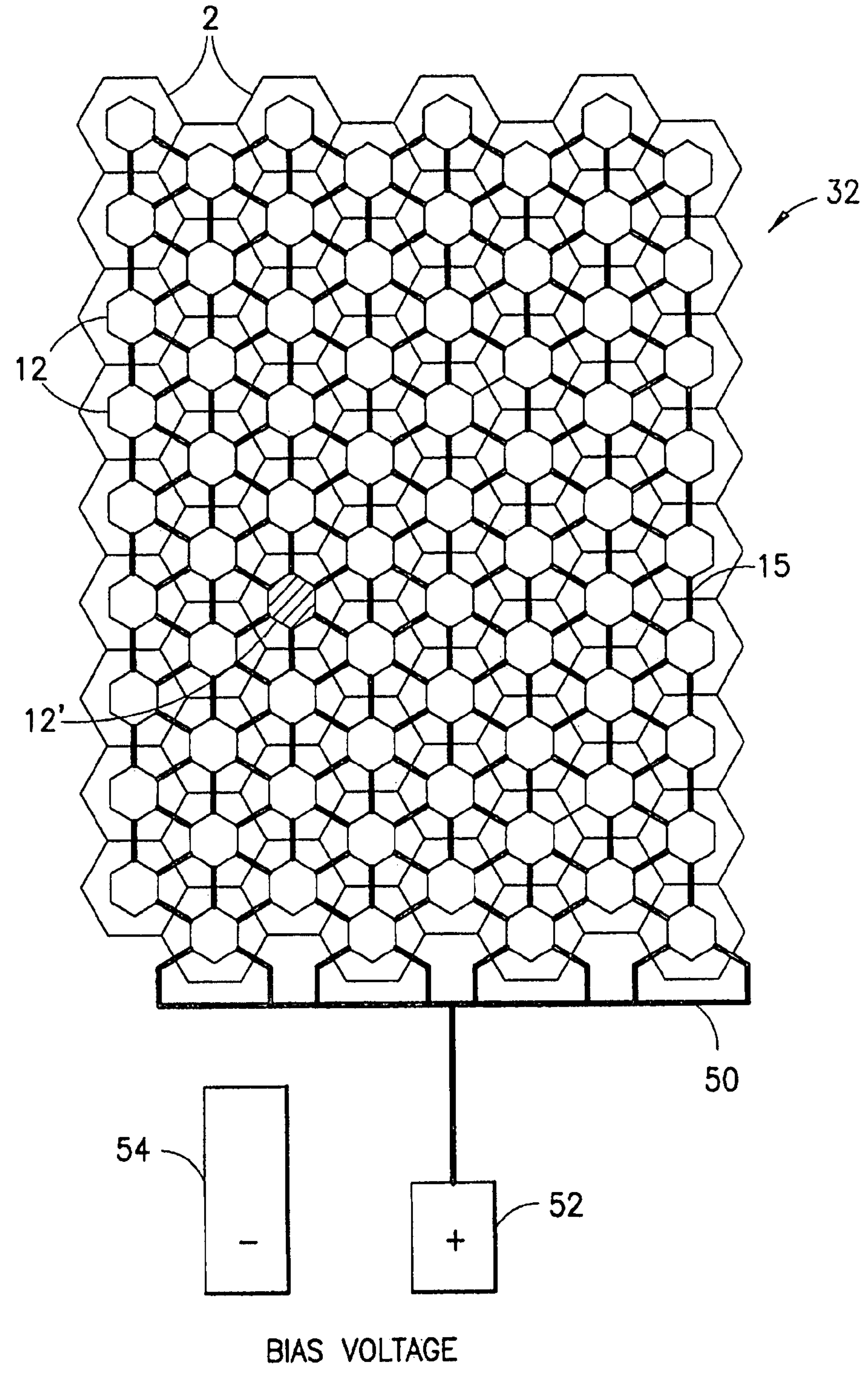
PRIOR ART FIG.6
FIG. 6 is a drawing showing a top view of the acoustical subelement of FIG. 5, but having a single short-circuited cMUT cell that causes the entire subelement to be nonfunctional due to the lack of bias voltage across the electrodes. A top electrode of the defective cell is indicated by a hatched hexagon.

One shortfall with conventional cMUT designs lies in the electrode patterning on the cMUT, and the cascade of events that occur when a single cell short circuits to ground. In a known implementation shown in FIG. 5, the top electrode 12 on each cell 2 of a rectangular acoustical subelement 32 is connected to its nearest neighbors using simply patterned "spoke" interconnects 15. The interconnected top electrodes 12 are connected to a bias voltage bus 50, which is in turn connected to one terminal 52 of a source of bias voltage. Conversely, the interconnected bottom electrodes (not shown in FIG. 5) of the cMUT cells 2 are coupled to another terminal 54 of the bias voltage source. In the event that the top electrode of a single cell forms a short circuit to ground, the entire subelement is effectively short-circuited to ground, due to this interconnection. This event is illustrated in FIG. 6 by a hatched hexagon representing a top electrode 12' that is short-circuited to ground. The problem spreads when the short-circuited subelement is switchably connected to other functional subelements to configure an element, e.g., an annular ring element. In that event, all of the interconnected subelements making up the element are short-circuited. This problem is compounded by the reduction in bias voltage that is available to other functioning acoustical subelements due to shorted elements. The reduced cMUT bias voltage degrades the performance of the cMUT array. Future cMUT arrays may contain thousands of subelements instead of only several hundred. Thus, there exists a cascading effect whereby only a few individual cells out of thousands can render an entire array useless.

Figure 7:
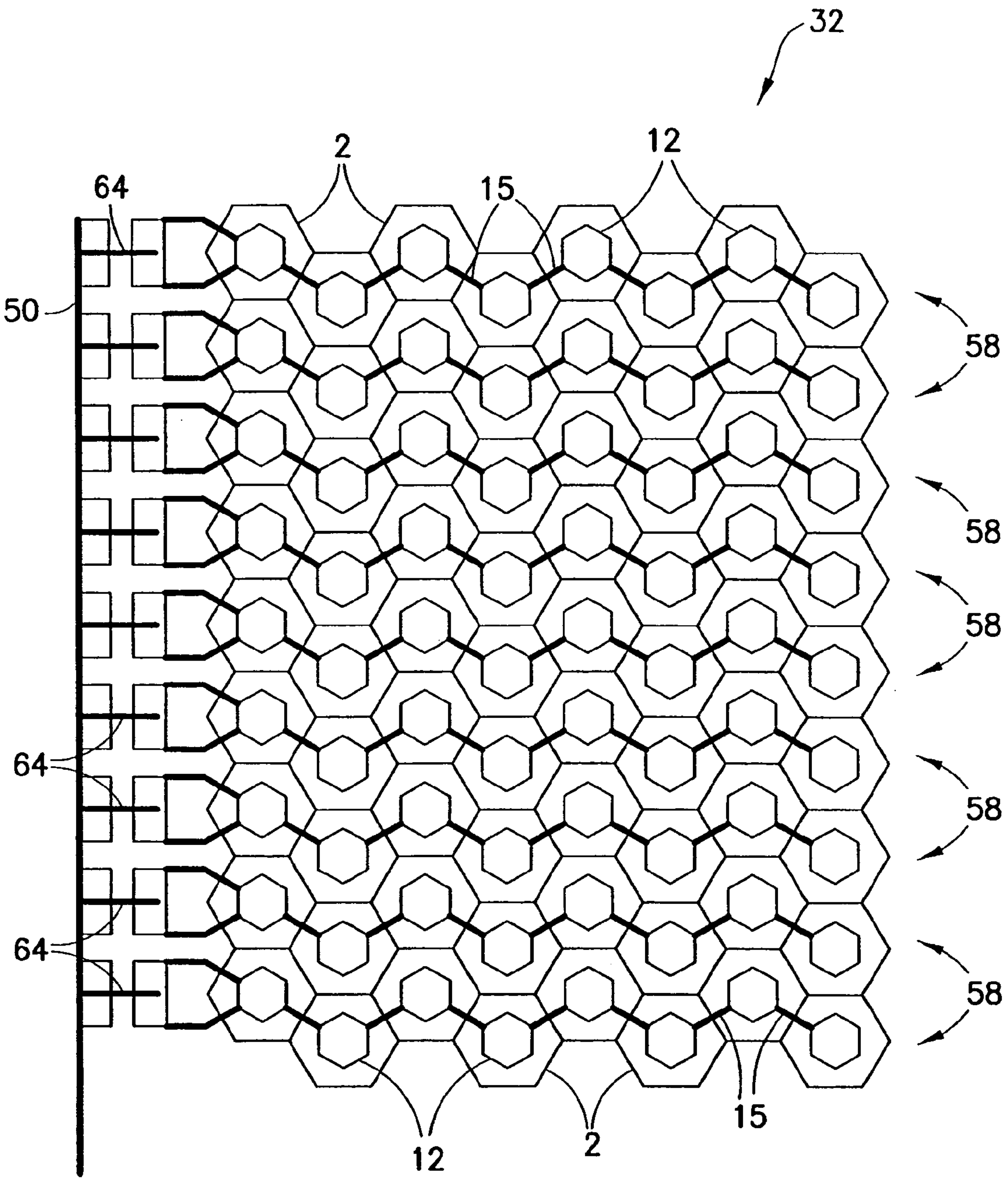
FIG. 7 is a drawing showing a top view of a multiplicity of rows of cMUT cells, each row being connected to a bias voltage bus line via a respective isolation fuse in accordance with a first embodiment of the present invention.

In accordance with some embodiments of the present invention, each acoustical subelement (or element in arrays that do not form elements by combining subelements) is divided into smaller cell groups, a short-circuited cell group of the acoustical subelement being electrically isolated from the non-shorted cell groups. In accordance with a first embodiment of the invention depicted in FIG. 7, each acoustical subelement 32 comprises a multiplicity of groups 58 of cMUT cells. In this example, each cell group 58 comprises a row (oriented horizontally) of cMUT cells 2 (eight cells per row) whose top electrodes 12 are connected in series. Each top electrode 12 of a cMUT cell group 58 is hexagonal in FIG. 7. However, the top electrodes may have geometric shapes other than a hexagon, e.g., circles. The bottom electrodes may also be series connected, or a common bottom electrode may be provided for the cells of each row. In FIG. 7, the top electrodes of cells not at the ends of the row each have two electrically conductive spokes extending from respective vertices of the hexagon for connecting each electrode in a row to its two neighbors. Each cell group 58 is connected to a common bias voltage bus line 50 by way of a respective fuse 64, which is depicted as a fusible electrical conductor bridging a pair of electrically conductive pads, one pad being connected to electrical connectors from the cMUT cells and the other pad being connected to the bias voltage bus line 50. Each fuse 64 is designed to form an open circuit (e.g., by melting of the fusible conductor) whenever a cMUT cell 2 in the respective cell group 58 short circuits to ground and causes increased current flow through the fuse. Therefore, when the fuse 64 blows and forms an open circuit, the shorted cell group 58 is isolated from the remainder of the acoustical subelement (i.e., the non-shorted cell groups), and the full bias voltage is still applied to the functioning portion of the subelement, as well as to the remainder of the subelements in the array. The fuses may be formed in any conventional manner. For example, the fuse material may be the same as the material used to form the bias voltage bus line or the connecting spoke from the proximal top electrode, in which case the resistance of the fuse is significantly larger than the resistance of the bias voltage bus line 50 and the spoke connector 15. Alternatively, the fuse material may be different than the material of the bias voltage bus line or the connecting spoke (i.e., conductive semiconductor, metal, metal alloy, doped silicon, doped polycrystalline silicon). Both the fuse geometry, i.e., length, width, and depth, and the material properties, i.e., resistivity and melting point, determine the operational characteristics of the fuse.

Figure 8:
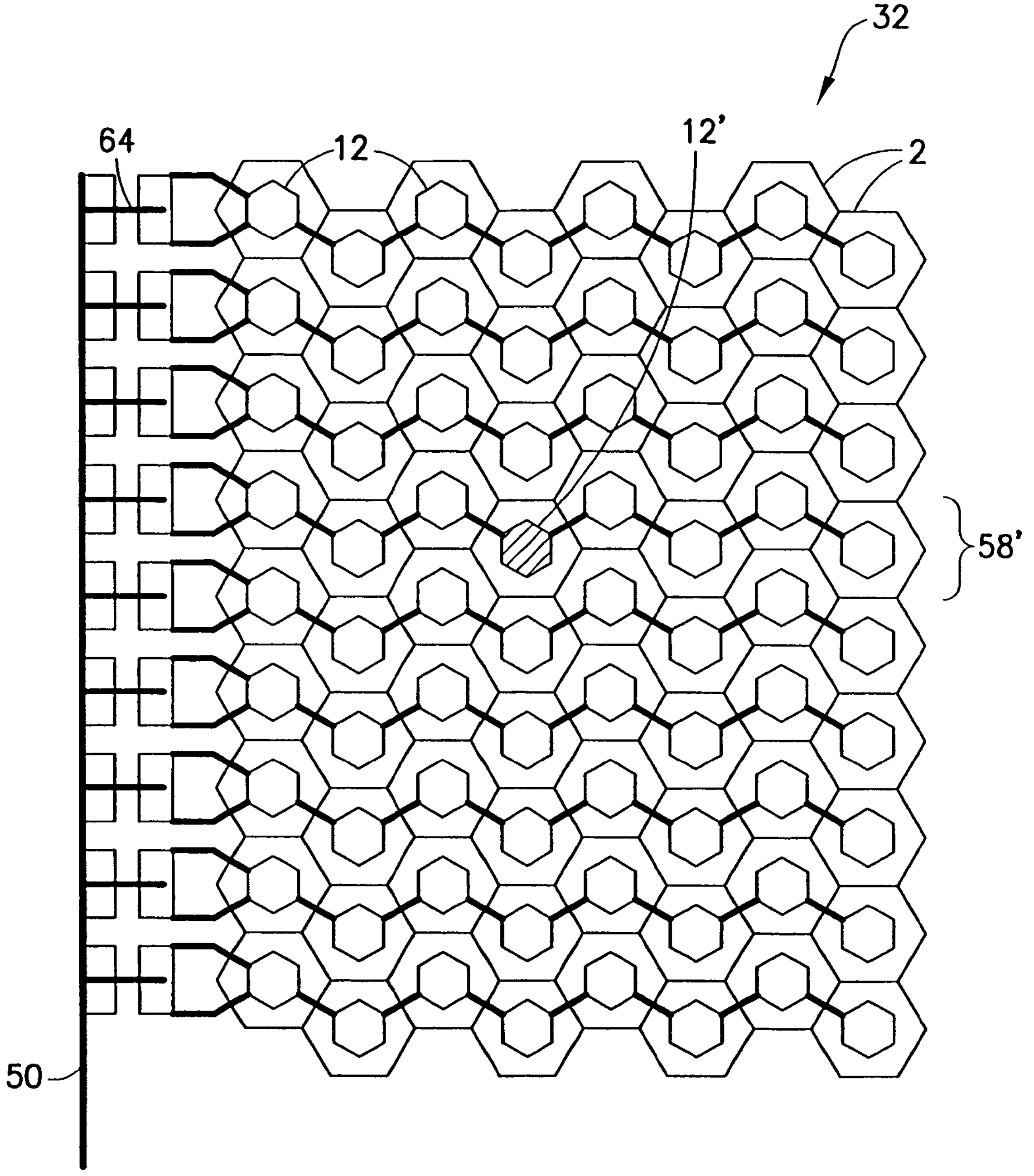
FIG. 8 shows the same multiplicity of rows of cMUT cells as shown in FIG. 7, except that a top electrode of a short-circuited cMUT has been indicated as a hatched hexagon.
Figure 9:
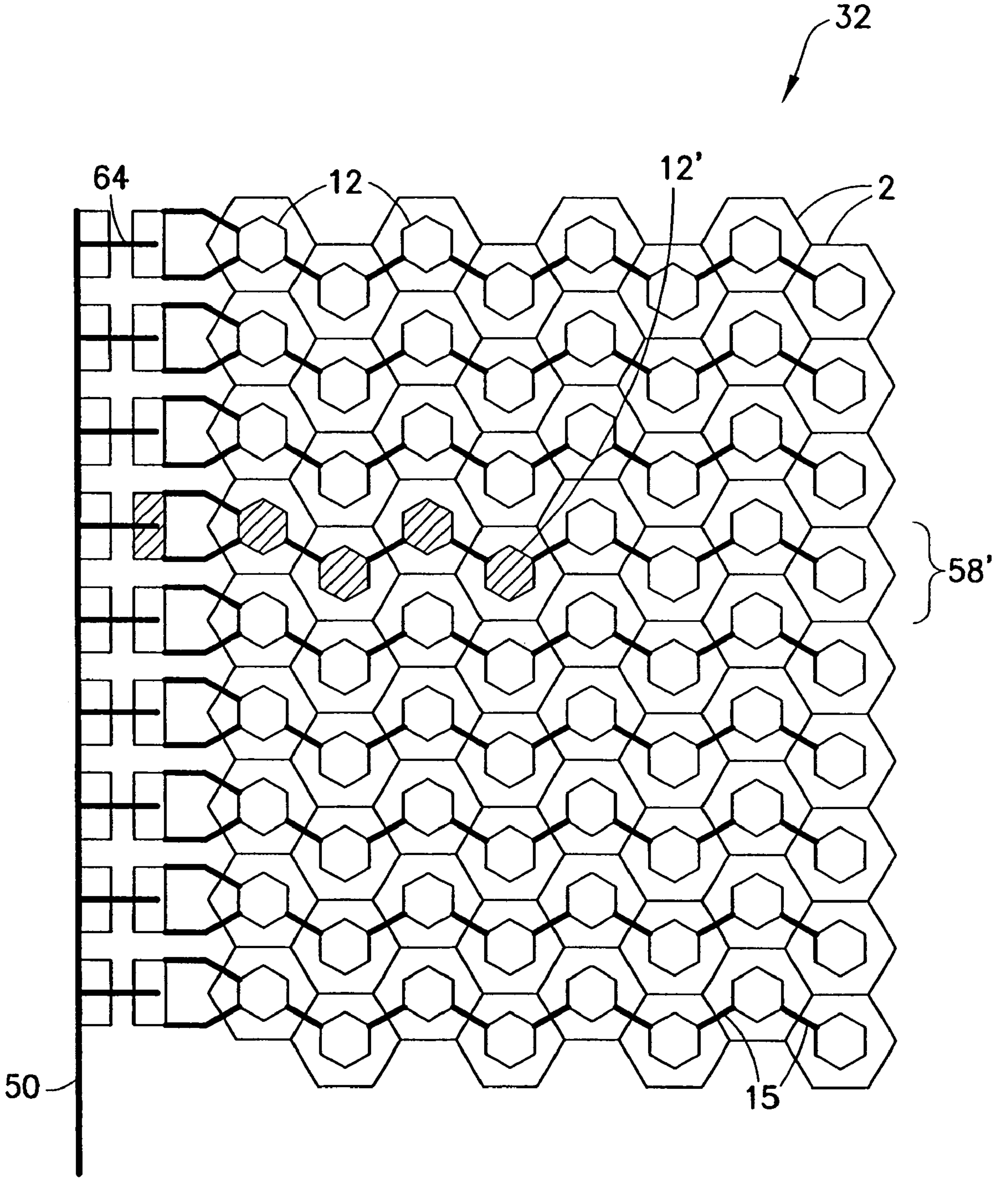
FIG. 9 shows the same multiplicity of rows of cMUT cells as shown in FIG. 7, except that a series of top electrodes in a region of increased current flow (caused by the short-circuited cMUT cell shown in FIG. 8) has been indicated in part by a series of hatched hexagons.
Figure 10:
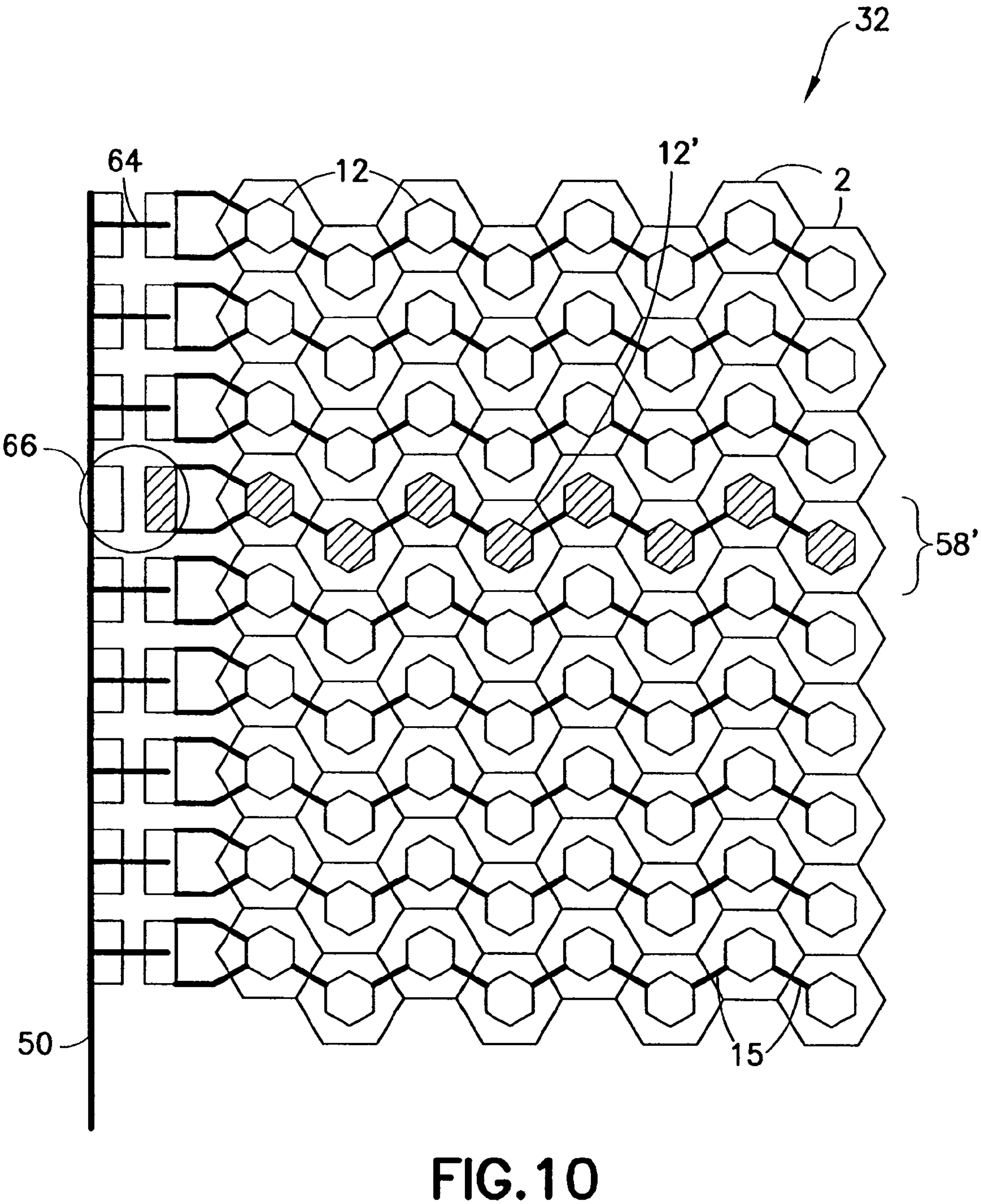
FIG. 10 shows the same multiplicity of rows of cMUT cells as shown in FIG. 7, except that the top electrodes of a row that has been de-activated by a blown fuse (caused by the increased current flow shown in FIG. 9) have been indicated by hatched hexagons.

The isolation process is illustrated in FIGS. 8 through 10. In FIG. 8, the solitary hatched hexagon represents a shorted top electrode 12' of a cMUT cell located in the fourth cell group (i.e., row) from the top. As in FIG. 7, each cell group comprises a series of eight cMUT cells whose top electrodes are connected in series. In this particular implementation, the cMUT cells of each cell group follow a zigzag pattern dictated by the hexagonal grid. However, in an alternative implementation, the cells of each group could be disposed in linear columns, with the bias voltage bus placed at the bottom (as shown later in FIG. 14).

The shorted cMUT cell in FIG. 8 causes increased current flow in the path from the bias voltage bus 50 to the top electrode 12' of the shorted cMUT cell in cell group 58'. This increased current flow is indicated in part by four hatched hexagons in FIG. 9. Each fuse 64 is designed to blow when the increased current flow reaches a predetermined threshold. FIG. 10 shows the blown fuse (inside the circle 66) associated with cell group 58', caused by the shorted top electrode 12'. The blown fuse results in the cell group 58' being disconnected from the bias voltage bus line 50. This de-activates cell group 58', but the remaining cell groups of the subelement 32 are unaffected by the short circuit and function properly.

Although the isolatable cell groups shown in FIGS. 7-10 each have eight cMUT cells, in practice any number of cells can form an isolatable cell group, with smaller cell groups resulting in improved performance in the event of a short circuit.

Figure 11:
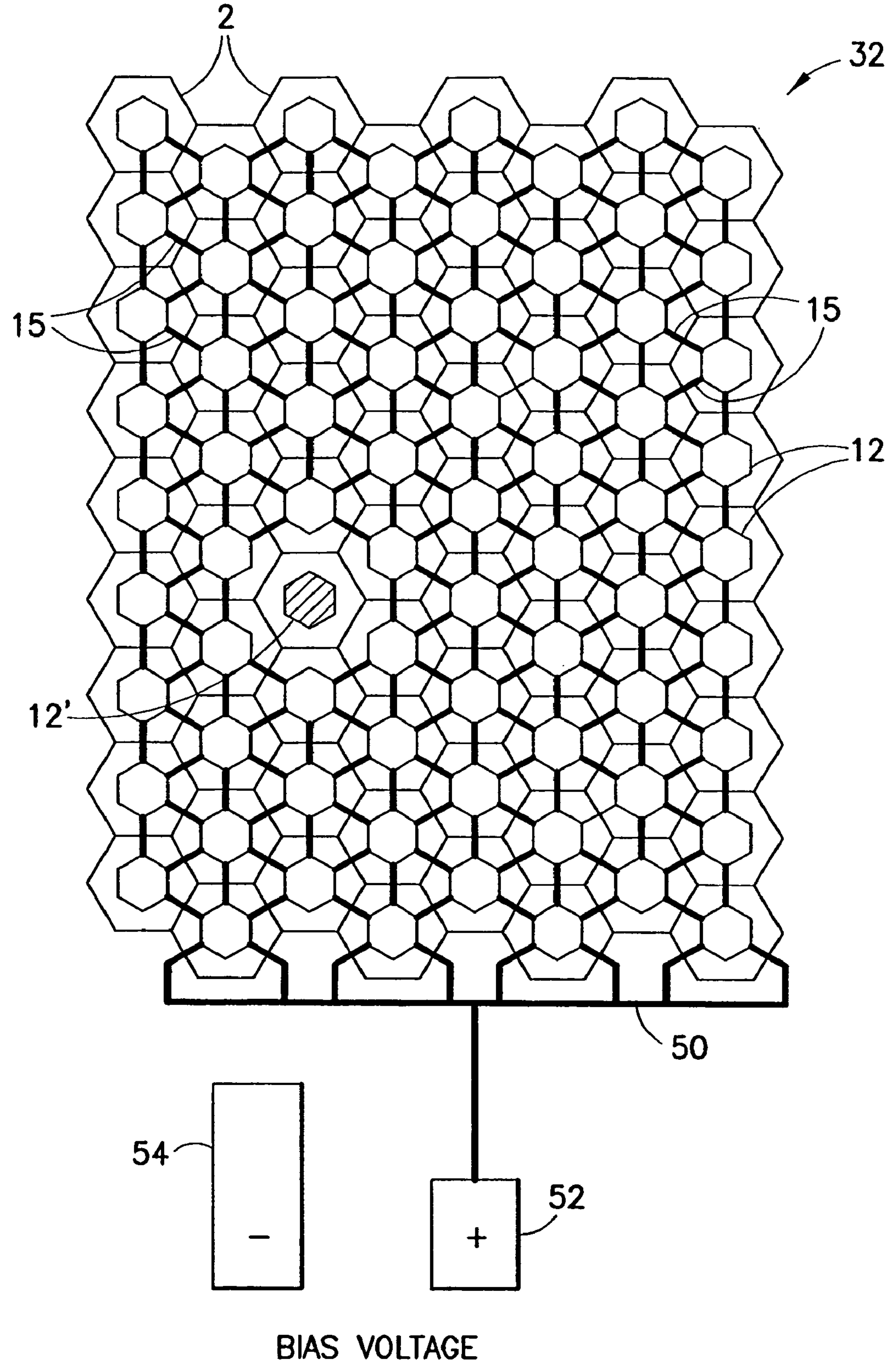
FIG. 11 is a drawing showing a top view of a multiplicity of cMUT cells interconnected via fuses in accordance with a second embodiment of the present invention. A top electrode of a defective cell isolated by blown fuses is indicated by a hatched hexagon.

In accordance with a second embodiment of the invention shown in FIG. 11, the top electrode 12 of each individual cMUT cell is connected to the top electrodes of its neighbors by means of electrical connectors that are specially designed to be fuses. More specifically, each of the spokes 15 connecting the vertices of the cell electrode 12 to its neighbors is designed to melt when the current flow therethrough is great enough. In the example depicted in FIG. 11, one top electrode 12' has been shorted, causing all of its six fuses to be blown. As a result, if a single cell is shorted to ground, that single cell will be electrically isolated from all other cells, as represented by the hatched hexagon 12' with no spokes in FIG. 11.

Figure 12:
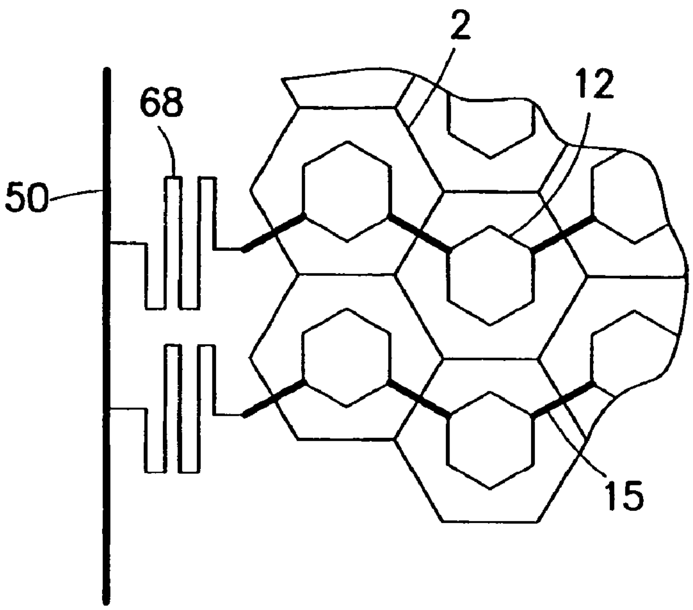
FIGS. 12 and 13 are drawings showing respective top views of two alternative fuse designs for isolating shorted sensor cell groups from a bias voltage bus line while minimizing overhead space.
Figure 13:
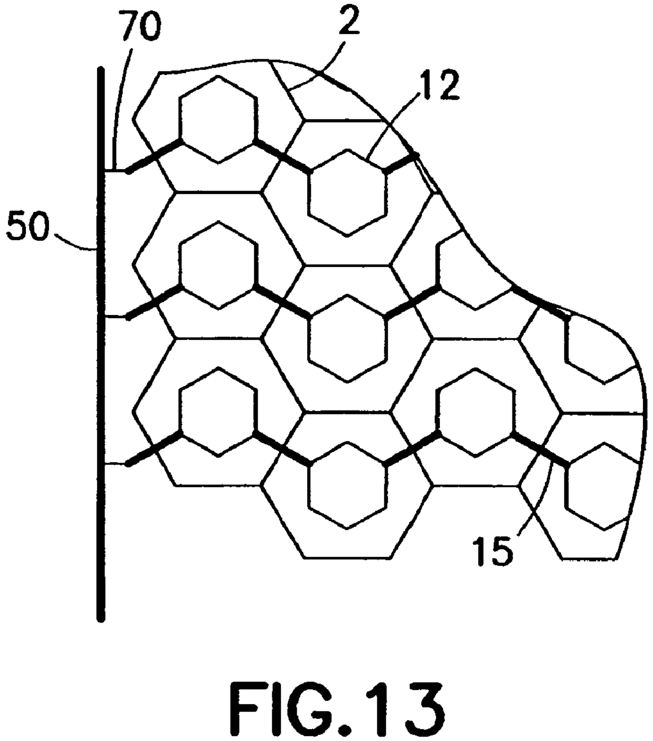

FIGS. 12 and 13 are drawings showing respective top views of two alternative fuse designs for isolating short-circuited sensor cell groups 58 from a bias voltage bus line 50 while minimizing overhead space. FIG. 12 shows serpentine conductors 68 designed to behave as fuses, one end of each serpentine fuse being connected to a spoke connector 15 connected to the top electrode 12 of the proximal cMUT cell in each respective row of cMUT cells and the other end of each serpentine fuse being connected to the bias voltage bus line 50. FIG. 13 shows short straight conductors 70 that behave as fuses, one end of each fuse 70 again being connected to a spoke connector 15 connected to the top electrode 12 of the proximal cMUT cell in each respective row of cMUT cells and the other end of each fuse 70 being connected to the bias voltage bus line 50. Due to the shortness of fuses 70, the interstitial space between adjacent acoustical subelements in a horizontal grouping (not shown) can be reduced as compared to the embodiment shown in FIG. 12.

Figure 14:
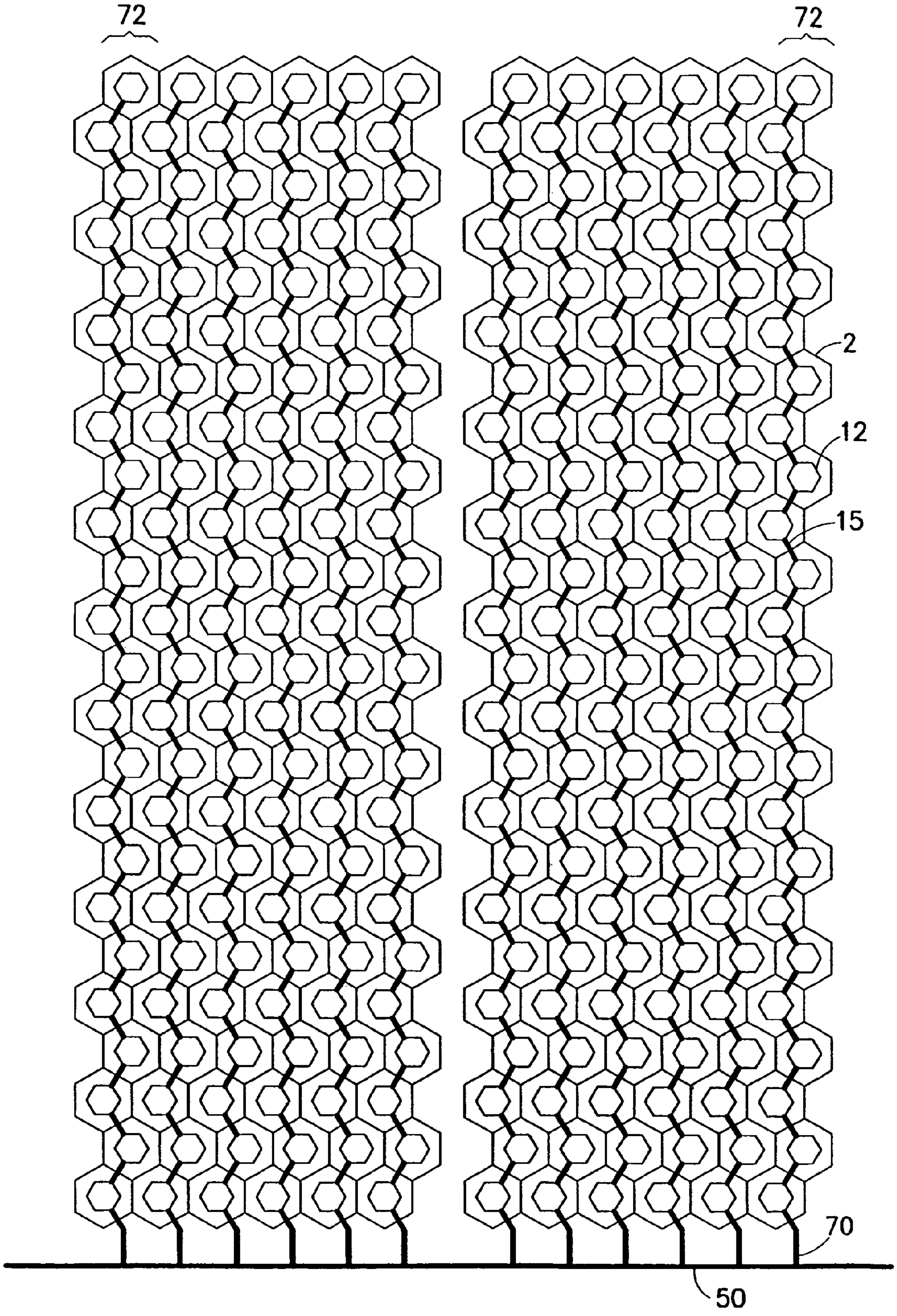
FIG. 14 is a drawing showing a top view of a vertical grouping of cMUT cells to reduce the overhead space of the isolation fuses.

In the case of a linear transducer array, the orientation of the isolatable cMUT cell groups in each acoustical subelement can be horizontal or vertical. FIG. 14 depicts two adjacent acoustical subelements of a linear array connected by a bus line 50 wherein the cMUT cells are disposed in vertical groups 72. [These could be elements if they were not connected by bus line 50.] This vertical orientation does not require area that is available for the acoustic aperture to be used up by the fuses. However, the isolatable cMUT cell groups will be larger for a vertical orientation as compared to a horizontal orientation.

Figure 15:
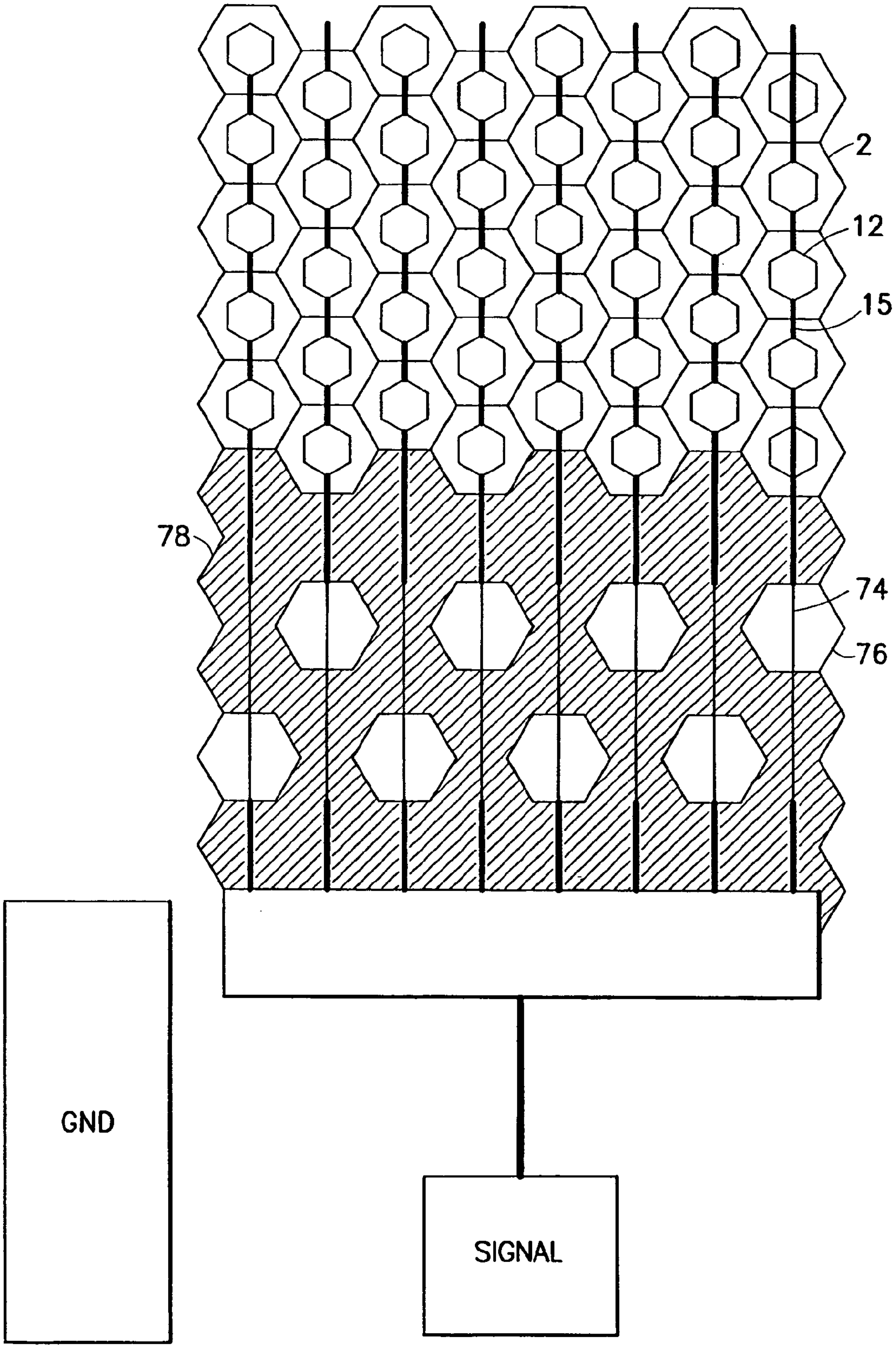
FIG. 15 is a drawing showing a top view of a plurality of cMUT cells connected to a bias voltage bus line via respective isolation fuses in accordance with a third embodiment of the invention, wherein each fuse traverses an evacuated region to improve thermal isolation of the fuse from the substrate.

In accordance with a third embodiment of the invention shown in FIG. 15, each fuse 74 traverses an inactive, but evacuated cMUT cell 76. [However, the inactive and evacuated region that the fuse traverses need not be in the shape of a cell. It could be any other shape.] During the manufacturing process, a layer of silicon oxide (or silicon nitride) is deposited on a silicon substrate. This silicon oxide layer is etched to form cavities for both the active cMUT cells 2 and the inactive cMUT cells 76. The region 78 in FIG. 15 represents a portion of the layer of silicon oxide where cavities are not formed. A layer of silicon nitride (or silicon) is then suspended over the cavities to form the membranes for the cMUT cells. The cavities are then evacuated. The vacuum underneath the inactive cMUT cells 76 improves the thermal isolation of the fuses 74 from the silicon substrate, increasing the likelihood that each fuse 74 will form an open circuit at the specified current rating. Thermal isolation of the fuse reduces the transfer of heat from the fuse to the substrate, resulting in the ability to more accurately predict maximum current handling capability of the fuse.

In accordance with a fourth embodiment of the invention, electrical circuits may be used as an alternative to fuses for short circuit protection. complementary metal oxide semiconductor (CMOS), bipolar and CMOS (BiCMOS), or bipolar, CMOS and double diffusion MOS (BCD) integrated circuit technology can be used to create short circuit protection modules that isolate the shorted cMUT cell groups. In this embodiment, through-wafer vias are used to electrically connect cMUT cell groups built on one wafer (shown in FIG. 16) to associated integrated electronics on another wafer (shown in FIG. 17).

Figure 16:
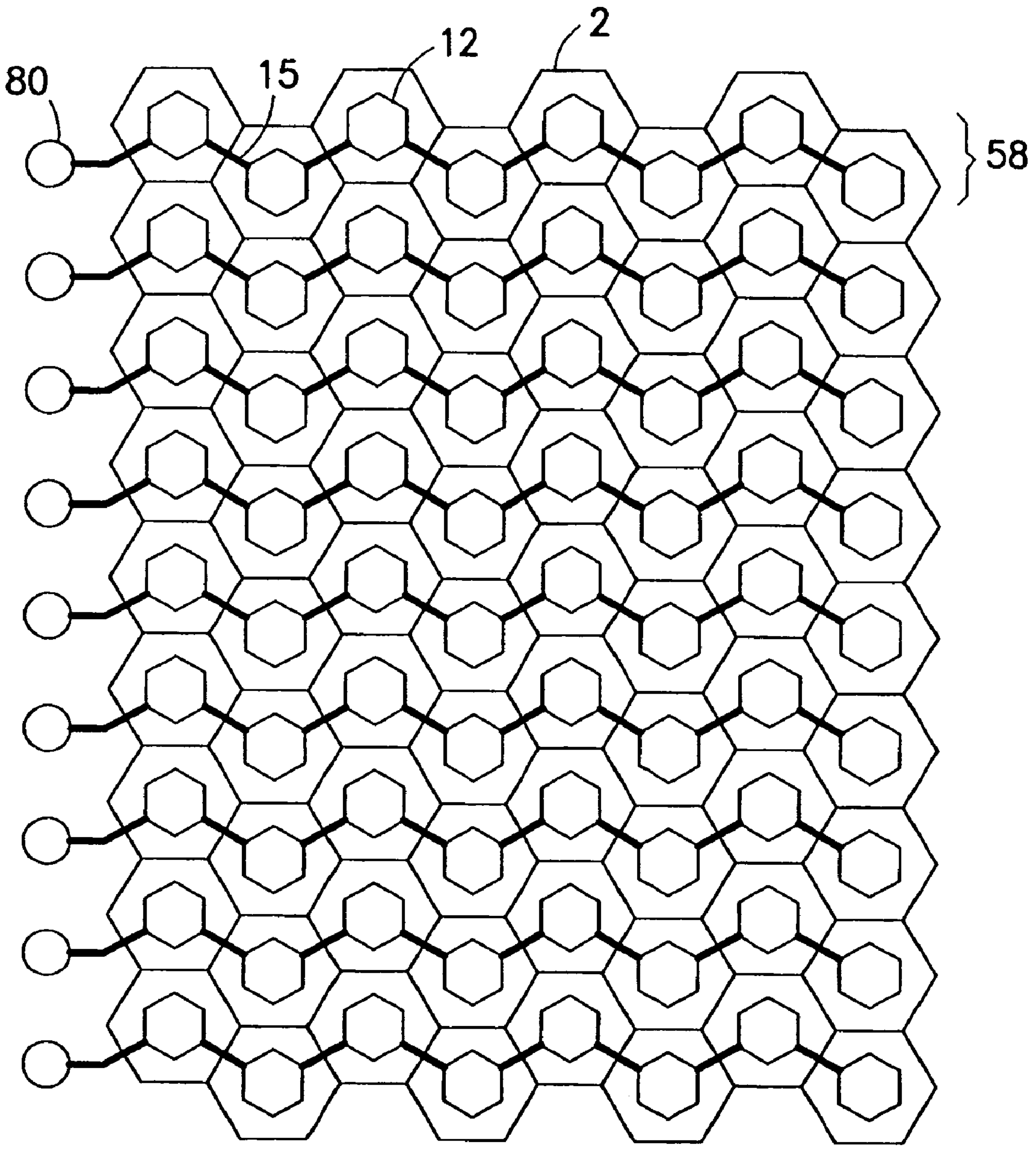
FIG. 16 is a drawing showing a top view of a multiplicity of cMUT cell groups built on a first wafer having vias for connecting to isolation electronics on a second wafer (shown in FIG. 17) in accordance with a fourth embodiment of the invention.

FIG. 16 shows a single acoustical subelement comprising a multiplicity of isolatable cMUT cell groups 58 in the form of rows of cMUT cells 2, the top electrodes 12 of each row being connected in series, as previously described with reference to FIG. 7. However, instead of the top electrodes being connected to a bias voltage bus line formed in the same substrate or wafer, in accordance with this fourth embodiment of the invention, the top electrodes of each cell group are connected to respective through-wafer vias 80, with the bias voltage bus line 50 (see FIG. 17) being formed in a different substrate or wafer laminated to the cMUT cell wafer.

Figure 17:
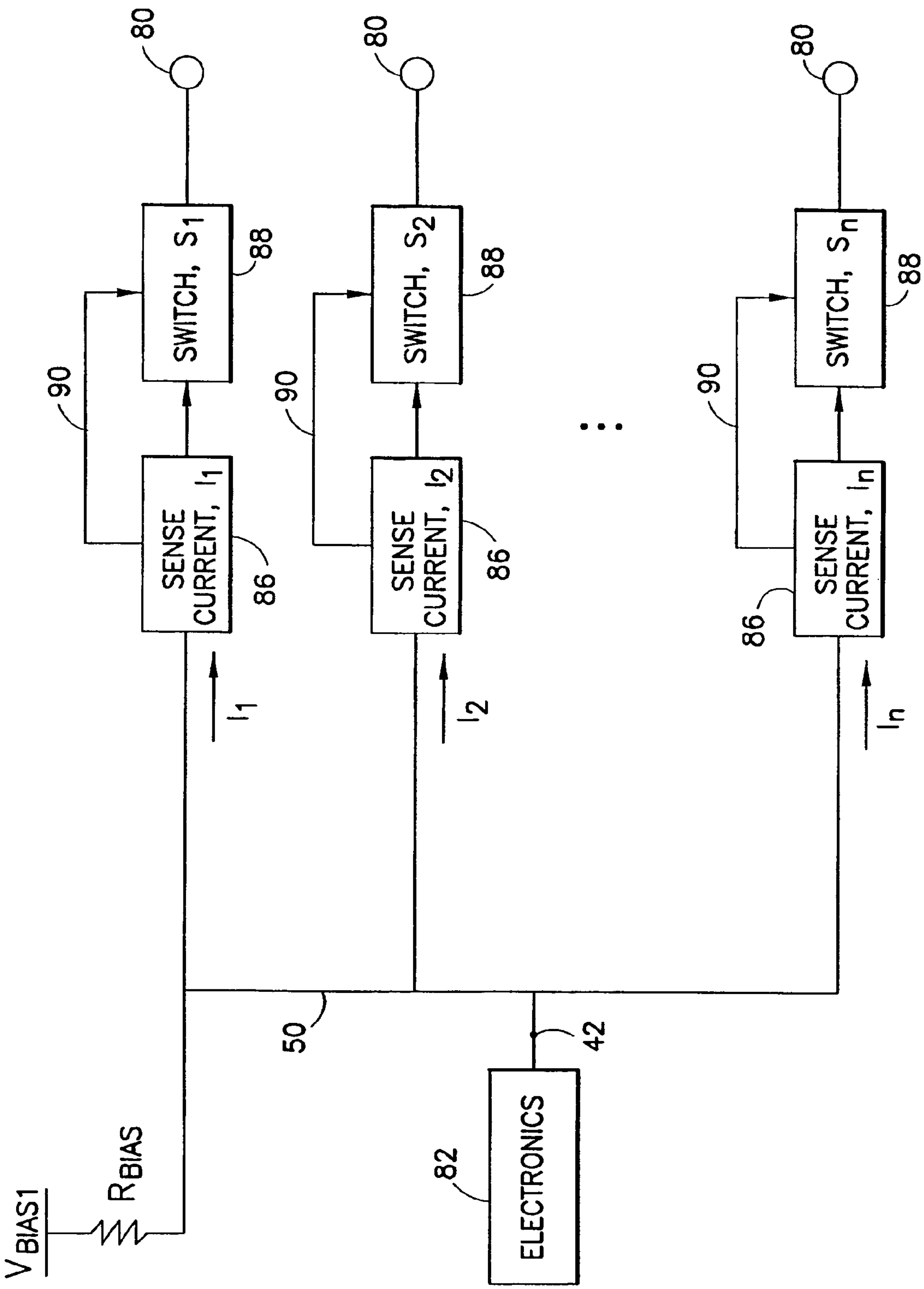
FIG. 17 is a block diagram showing the isolation electronics on the second wafer in accordance with the fourth embodiment of the invention.

FIG. 17 shows a set of short circuit protection modules corresponding to an equal number of cMUT cell groups making up one acoustical subelement (see, e.g., FIG. 16). The through-wafer vias 80 are electrically coupled to the bias voltage bus line 50 of the subelement by way of respective short circuit protection modules. The bias voltage bus line 50, in turn, connects to the connection point 42 of the subelement, as previously described with reference to FIG. 4. The block 82 in FIG. 17 represents the other electronics (e.g., multiplexers) integrated into the second (i.e., electronics) wafer.

As seen in FIG. 17, each short circuit protection module comprises a current sensor circuit 86 and an isolation switch 88 situated between the current sensor circuit and a respective through-wafer via 80. The current sensor circuit 86 senses the level of current flow through the respective via 80, which is also the current flow through the respective cMUT cell group connected to that via. During normal operation, the isolation switches 88 remain closed. When a short-circuit event occurs in a given cMUT cell group, increased current flows through the electrodes of the shorted cell group and through the associated via 80. The current sensor circuit is designed to output a switch control signal to the associated isolation switch 88 on line 90 when the increased current flow reaches a predetermined threshold corresponding to a short-circuit event. That switch control signal activates the opening of the isolation switch 88, thereby isolating the defective cMUT cell group from the remaining functioning cell groups of the subelement. The short circuit protection modules may be implemented with integrated circuits in high-voltage CMOS, BiCMOS, or BCD technologies In accordance with a fifth embodiment of the invention, the through-wafer vias themselves may be specially designed to act like fuses by controlling the deposition of metal in the via, controlling the via geometry, or filling the vias with a current-sensitive material. In this case the vias would be directly connected to the bias voltage bus line on the second wafer without intervening short circuit protection modules.

In accordance with those embodiments that utilize fuses, the fuse forms an open circuit due to joule heating caused by increased current flow from a short-circuited cell. The fuse may be made of the same conducting metal as the remainder of the electrode, in which case it must be geometrically designed to preferentially form an open circuit under the appropriate conditions. The fuse may also consist of a different conducting material than the remainder of the electrode. In this case, it is natural to select a material with a lower melting temperature and/or perhaps higher resistance than the electrode metal so that the fuse will preferentially form an open circuit.

In accordance with a further alternative embodiment, the fuses may be free-standing (i.e., suspended in air or vacuum) to improve thermal isolation.

This invention provides a simple and cost-effective way to ensure the performance of a cMUT array against large area failures due to short-circuited cells caused by any means, e.g., processing anomalies, natural statistical variations, contaminants, etc. In conventional cMUT arrays, there may be thousands of cells. Even if only a few of the cells form short circuits to ground, imaging performance is substantially degraded. Using the present invention, those shorted cells will be isolated and will have a negligible effect on imaging performance. For those applications utilizing electronics that connect to the cMUT with through-wafer via interconnection, very simple additions can be made to the electronics wafer using standard integrated circuit CMOS technology that isolate the acoustical subelements in the event of a short circuit.

The invention may also be used with pMUTs, especially pMUTs made using electrostrictive ceramics that require a bias voltage. However, the fuses disclosed herein could also be useful in the absence of a bias voltage. This would be true if someone designed cMUTs that do not require a bias voltage or in the case of pMUTs made with standard PZT-type piezoelectric ceramics that do not need a bias voltage.

While the invention has been described with reference to preferred embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

The invention claimed is:

1. A device comprising an array of sensors and a multiplicity of bus lines, each sensor being electrically connected to a respective bus line and comprising a respective multiplicity of cell groups of micromachined sensor cells, the sensor cell groups of a particular sensor being electrically coupled to each other via the bus line to which that sensor is connected, each sensor comprising a respective multiplicity of micromachined sensor cell groups that are electrically interconnected to each other and not switchably disconnectable from each other, said device further comprising a sensor cell group that is isolated from other sensor cell groups, is short-circuited to ground and is electrically decoupled from any bus line.

2. The device as recited in claim 1, wherein each of said micromachined sensor cells is a respective MUT cell.

3. The device as recited in claim 1, further comprising means for isolating any one of said sensor cell groups from said bus line and in response to any one of the micromachined sensor cells of that sensor cell group being short-circuited to ground.

4. The device as recited in claim 3, wherein said isolating means comprise a multiplicity of fuses, each fuse coupling a respective sensor cell group to the associated bus line in the absence of any one of the micromachined sensor cells of that sensor cell group being short-circuited to ground.

5. The device as recited in claim 3, wherein each of said micromachined sensor cells is a respective MUT cell, and said isolating means comprise a multiplicity of fuses, each fuse coupling a respective sensor cell group to the associated bus line, said device further comprising a multiplicity of inactive, but evacuated regions, each of said fuses traversing a respective one of said inactive evacuated regions.

6. The device as recited in claim 3, wherein each of said micromachined sensor cells is a respective MUT cell, and said isolating means comprise a multiplicity of fuses, each fuse coupling a respective sensor cell group to the associated bus line, each of said fuses being free-standing.

7. The device as recited in claim 1, further comprising a multiplicity of short circuit protection modules, each short circuit protection module comprising a current sensor circuit for detecting a level of current flowing through a respective sensor cell group and an electrical isolation switch for coupling said respective sensor cell group to its associated bus line, said current sensor circuit causing said electrical isolation switch to open in response to sensing a current level indicative of a short circuit in said respective sensor cell group.

8. The device as recited in claim 7, wherein said array of sensors is built on a first wafer and said multiplicity of short circuit protection modules is built on a second wafer, each electrical isolation switch being connected to a respective sensor by a respective electrically conductive via in said first wafer.

9. A device comprising an array of sensors and a multiplicity of bus lines, each sensor being electrically connected to a respective bus line and comprising a respective multiplicity of micromachined sensor cells or cell groups that are electrically interconnected to each other and not switchably disconnectable from each other, said device further comprising means for isolating any one of said sensor cells or cell groups from another of said sensor cells or cell groups or its associated bus line in response to a sensor cell of said sensor cells or cell groups being short-circuited to ground.

10. The device as recited in claim 9, wherein each of said micromachined sensor cells is a respective MUT cell.

11. The device as recited in claim 9, wherein said isolating means comprise a multiplicity of fuses, each fuse coupling a respective sensor cell group to the associated bus line in the absence of any one of the micromachined sensor cells of that sensor cell group being short-circuited to ground.

12. The device as recited in claim 9, wherein said isolating means comprise a multiplicity of short circuit protection modules, each short circuit protection module comprising a current sensor circuit for detecting a level of current flowing through a respective sensor cell group and an electrical isolation switch for coupling said respective sensor cell group to its associated bus line, said current sensor circuit causing said electrical isolation switch to open in response to sensing a current level indicative of a short circuit in said respective sensor cell group.

13. A device comprising:

a bus line;

a first multiplicity of micromachined sensor cells each comprising a respective electrode, said electrodes of said first multiplicity of sensor cells being interconnected and not switchably disconnectable from each other; and a first fuse that bridges a first junction electrically connected to said bus line and a second junction electrically connected to said electrode of one of said first multiplicity of sensor cells, wherein said first fuse is designed to blow in response to short circuiting of said electrodes of said first multiplicity of sensor cells.

14. The device as recited in claim 13, further comprising:

a second multiplicity of micromachined sensor cells each comprising a respective electrode, said electrodes of said second multiplicity of sensor cells being interconnected and not switchably disconnectable from each other; and a second fuse that bridges a third junction electrically connected to said bus line and a fourth junction electrically connected to said electrode of one of said second multiplicity of sensor cells, wherein said second fuse is designed to blow in response to short circuiting of said electrodes of said second multiplicity of sensor cells.

15. The device as recited in claim 13, wherein each of said micromachined sensor cells is a respective MUT cell.

* * * * *